(12) United States Patent
Azadi et al.

(10) Patent No.: US 11,514,313 B2
(45) Date of Patent: Nov. 29, 2022

(54) SAMPLING FROM A GENERATOR NEURAL NETWORK USING A DISCRIMINATOR NEURAL NETWORK

(71) Applicant: Google LLC, Mountain View, CA (US)

(72) Inventors: Samaneh Azadi, El Cerrito, CA (US); Ian Goodfellow, Mountain View, CA (US); Catherine Olsson, San Francisco, CA (US); Augustus Quadrozzi Odena, San Francisco, CA (US)

(73) Assignee: Google LLC, Mountain View, CA (US)

( * ) Notice: Subject to any disclaimer, the term of this patent is extended or adjusted under 35 U.S.C. 154(b) by 626 days.

(21) Appl. No.: 16/580,649

(22) Filed: Sep. 24, 2019

(65) Prior Publication Data

US 2020/0104707 A1 Apr. 2, 2020

Related U.S. Application Data

(60) Provisional application No. 62/737,860, filed on Sep. 27, 2018.

(51) Int. Cl.
*G06N 3/08* (2006.01)
*G06N 3/04* (2006.01)
*G10L 15/16* (2006.01)

(52) U.S. Cl.
CPC ............. *G06N 3/08* (2013.01); *G06N 3/0454* (2013.01); *G06N 3/0472* (2013.01); *G10L 15/16* (2013.01)

(58) Field of Classification Search
CPC ...... G06N 3/0454; G06N 3/0472; G06N 3/08; G06N 3/088

USPC .......................................................... 706/25
See application file for complete search history.

(56) References Cited

U.S. PATENT DOCUMENTS

| | | | | |
|---|---|---|---|---|
| 5,866,907 | A * | 2/1999 | Drukier | G01T 1/208 250/366 |
| 7,206,938 | B2 * | 4/2007 | Bender | G06F 21/316 726/19 |
| 9,730,643 | B2 * | 8/2017 | Georgescu | G06V 10/82 |
| 10,621,760 | B2 * | 4/2020 | Fisher | G06N 3/08 |
| 10,650,492 | B2 * | 5/2020 | He | G06T 5/50 |
| 10,713,794 | B1 * | 7/2020 | He | G06N 3/0454 |
| 10,755,120 | B2 * | 8/2020 | Fu | G06T 3/4053 |
| 10,764,486 | B2 * | 9/2020 | Lee | H04N 5/232061 |

(Continued)

OTHER PUBLICATIONS

Atjovsky et al, "Wasserstein GAN" arXiv, Dec. 2017, 32 pages.

(Continued)

*Primary Examiner* — Antim G Shah
(74) *Attorney, Agent, or Firm* — Fish & Richardson P.C.

(57) ABSTRACT

Methods, systems, and apparatus, including computer programs encoded on a computer storage medium, for providing a data sample in response to a request for a data sample. In one aspect, a method comprises: receiving a request for a new data sample; until a candidate new data sample is generated that satisfies an acceptance criterion, performing operations comprising: generating a candidate new data sample using a generator neural network; processing the candidate new data sample using a discriminator neural network to generate an imitation score; and determining, from the imitation score, whether the candidate new data sample satisfies the acceptance criterion; and providing the candidate new data sample that satisfies the acceptance criterion in response to the received request.

20 Claims, 3 Drawing Sheets

DATA GENERATION SYSTEM 100

(56) References Cited

U.S. PATENT DOCUMENTS

| | | | | |
|---|---|---|---|---|
| 10,902,245 | B2* | 1/2021 | Du | G06V 10/454 |
| 11,151,334 | B2* | 10/2021 | Rezagholizadeh | G06N 3/084 |
| 11,291,532 | B2* | 4/2022 | Azernikov | G06K 9/6274 |
| 2004/0059950 | A1* | 3/2004 | Bender | G06F 21/316 |
| | | | | 713/186 |
| 2016/0174902 | A1* | 6/2016 | Georgescu | G16H 50/30 |
| | | | | 600/408 |
| 2018/0028294 | A1* | 2/2018 | Azernikov | G06V 10/82 |
| 2019/0080433 | A1* | 3/2019 | He | G06T 3/4007 |
| 2019/0087648 | A1* | 3/2019 | Du | G06N 3/0454 |
| 2019/0095730 | A1* | 3/2019 | Fu | G06N 3/0445 |
| 2019/0215438 | A1* | 7/2019 | Lee | H04N 5/232061 |
| 2019/0385346 | A1* | 12/2019 | Fisher | G06F 40/109 |
| 2020/0097554 | A1* | 3/2020 | Rezagholizadeh | G06N 3/0472 |
| 2020/0104707 | A1* | 4/2020 | Azadi | G06N 3/0472 |
| 2020/0387798 | A1* | 12/2020 | Hewage | G06N 3/08 |

OTHER PUBLICATIONS

Arora et al, "Do gans actually learn the distribution? An empirical study" arXiv, Jul. 2017, 11 pages.
Azadi et al, "Multi-content gan for few-shot font style transfer" arXiv, Dec. 2017, 16 pages.
Casella et al, "Generalized accept-reject sampling schemes" Institute of Mathematical Statistics, 2004, 6 pages.
Dumoulin et al, "Adversarially Learned Inference" arXiv, Feb. 2017, 18 pages.
Goodfellow et al, "Generative Adversarial Networks" arXiv, Jun. 2014, 9 pages.
Grover et al, "Variational rejection sampling" arXiv, Apr. 2018, 14 pages.
Gulrajani et al, "Improved training of wasserstein gans" arXiv, Dec. 2017, 20 pages.
He et al, "Deep residual learning for image recognition" IEEE Conference on Computer Vision and Pattern Recognition, 2016, 9 pages.
Hensel et al, "GANs Trained by a Two Time-Scale Update Rule Converge to a Local Nash Equilibrium" arXiv, Jan. 2018, 38 pages.
Isola et al, "Image-to-image translation with conditional adversarial networks" arXiv, Nov. 2018, 17 pages.
Kumar et al, "Improved Semi-supervised Learning with GANs using Manifold Invariances" arXiv, May 2017, 15 pages.
Ledig et al, "Photo-realistic single image super-resolution using a generative adversarial network" arXiv, May 2017, 19 pages.
Li et al, "MMD GAN: Towards deeper understanding of moment matching network" arXiv, Nov. 2017, 14 pages.
Lim et al, "Geometric GAN" arXiv, May 2017, 17 pages.
Lin et al, "PacGAN: The power of two samples in generative adversarial networks" arXiv, Nov. 2018, 49 pages.
MacKay, "Information theory, inference and learning algorithms" Cambridge University, 2003, 640 pages.
Mao et al, "Least squares generative adversarial networks" arXiv, Apr. 2017, 16 pages.
Miyato et al, "cGANs with Projection Discriminator" arXiv, Aug. 2018, 21 pages.
Miyato et al, "Spectral normalization for generative adversarial networks" arXiv, Feb. 2018, 26 pages.
Odena, "Semi-Supervised Learning with Generative Adversarial Networks" arXiv, Oct. 2016, 3 pages.
Odena et al, "Is Generator Conditioning Causally Related to GAN Performance?" arXiv, Jun. 2018, 14 pages.
Olsson et al, "Skill Rating for Generative Models" arXiv, Aug. 2018, 28 pages.
Russakovsky et al, "ImageNet Large Scale Visual Recognition Challenge" arXiv, Jan. 2015, 43 pages.
Salimans et al, "Improved Techniques for Training GANs" arXiv, Jun. 2016, 10 pages.
Springenberg, "Unsupervised and Semi-supervised Learning with Categorical Generative Adversarial Networks" arXiv, Apr. 2016, 20 pages.
Srivastava et al, "Veegan: Reducing mode collapse in gans using implicit variational learning" arXiv, Nov. 2017, 17 pages.
Szegedy et al, "Going deeper with convolutions" arXiv, Sep. 2014, 12 pages.
Tran et al, "Hierarchical Implicit Models and Likelihood-Free Variational Inference" arXiv, Nov. 2017, 15 pages.
Wang et al, "Non-local neural networks" arXiv, Apr. 2018, 10 pages.
Yi et al, "Dualgan: Unsupervised dual learning for image-to-image translation" arXiv, Oct. 2018, 17 pages.
Yu et al, "Generative image inpainting with contextual attention" arXiv, Mar. 2018, 15 pages.
Zhang et al, "Self-attention generative adversarial networks" arXiv, Jun. 2019, 10 pages.
Zhu et al, "Unpaired Image-to-image Translation using Cycle-Consistent Adversarial Networks" arXiv, Nov. 2018, 18 pages.

* cited by examiner

SAMPLING FROM A GENERATOR NEURAL NETWORK USING A DISCRIMINATOR NEURAL NETWORK

CROSS-REFERENCE TO RELATED APPLICATION

This application claims priority under 35 U.S.C. 119 to Provisional Application No. 62/737,860, filed Sep. 27, 2018, which is incorporated by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that generates data samples, e.g., images, audio segments, or text segments.

According to a first aspect there is provided a method performed by one or more data processing apparatus, the method including receiving a request for a new data sample. Until a candidate new data sample is generated that satisfies an acceptance criterion, the method includes generating a candidate new data sample using a generator neural network. The candidate new data sample is processed using a discriminator neural network to generate an imitation score. The discriminator neural network has been trained to generate an imitation score for a data sample that characterizes a likelihood for whether the data sample was: (i) drawn from a training set of given data samples, or (ii) generated by the generator neural network. Whether the candidate new data sample satisfies the acceptance criterion is determined from the imitation score. The candidate new data sample that satisfies the acceptance criterion is provided in response to the received request.

In some implementations, the candidate new data samples generated by the generator neural network are images.

In some implementations, determining, from the imitation score, whether the candidate new sample satisfies the acceptance criterion includes: determining an acceptance score from the imitation score; obtaining a control sample by sampling from a probability distribution over a range of numerical values; and determining the candidate new data sample satisfies the acceptance criterion if the acceptance score has a higher value than the control sample.

In some implementations, determining an acceptance score from the imitation score includes: updating a value of a bounding variable by determining a current value of the bounding variable to be a maximum of: (i) a previous value of the bounding variable, and (ii) the imitation score; and determining the acceptance score from the imitation score and the updated bounding variable.

In some implementations, determining the acceptance score from the imitation score and the updated bounding variable includes determining the acceptance score to be $\sigma(a)$, where $\sigma(\cdot)$ is a sigmoid function, where a is defined as: $a := D - D_M - \log(1 - \exp(D - D_M))$, where D is the imitation score, and where $D_M$ is the current value of the bounding variable.

In some implementations, determining the acceptance score from the imitation score and the updated bounding variable includes determining the acceptance score to be $\sigma(a-\gamma)$, where $\sigma(\cdot)$ is a sigmoid function, where $\gamma$ is a numerical value, where a is defined as: $a := D - D_M - \log(1 - \exp(D - D_M - \in))$, where D is the imitation score, where $D_M$ is the current value of the bounding variable, and where $\in$ is a constant added for numerical stability.

In some implementations, the method further includes determining the numerical value $\gamma$ to be a predetermined percentile of previously determined acceptance scores.

In some implementations, obtaining a control sample by sampling from a probability distribution over a range of numerical values includes obtaining the control sample by sampling from a uniform probability distribution over the range [0,1].

In some implementations, the discriminator neural network has been trained using a logistic loss function.

In some implementations, processing the imitation score using a sigmoid function defines a probability that the data sample was drawn from the training set of given data samples.

According to a second aspect there is provided a system including one or more computers and one or more storage devices storing instructions that when executed by the one or more computers cause the one or more computers to perform the operations of the method of the first aspect.

According to a third aspect there are provided one or more computer storage media storing instructions that when executed by one or more computers cause the one or more computers to perform the operations of the method of the first aspect.

Particular embodiments of the subject matter described in this specification can be implemented so as to realize one or more of the following advantages.

A generator neural network can learn to generate new data samples (e.g., images) that share similar characteristics to a training set of "real" data samples as a result of being trained in tandem with a discriminator neural network. (As used throughout this document, a "data sample" can refer to any appropriate element of digital data, e.g., an image, a text segment, or an audio segment). The discriminator neural network is trained to discriminate between data samples generated by the generator neural network and the real data samples, and the generator neural network is trained to generate data samples that the discriminator neural network characterizes as likely to be real data samples. Over the course of training, the generator neural network becomes progressively better at generating data samples having similar characteristics to the real data samples, and the discriminator neural network continually adapts to identify differences between the real data samples and the data samples generated by the generator neural network.

In some conventional systems, at the end of training, the generator neural network is deployed (i.e., to generate new data samples), and the discriminator neural network is discarded (i.e., as no longer relevant). That is, the discriminator neural network serves only to facilitate training of the generator neural network and is not used after training. The system described in this specification uses the information retained in the weights of the discriminator neural network at the end of training to filter data samples generated by the generator neural network, i.e., by "accepting" only certain data samples generated by the generator neural network, and "rejecting" the remainder. The accepted data samples provided by the data generation system may have characteristics that are overall more consistent with the training set of real data samples than the full set of data samples generated by the generator neural network. For example, the data generation system may be more likely to filter images having visual characteristics that are inconsistent with a training set of real images, e.g., images that are blurry or otherwise have low visual quality, or images that depict unrealistic objects. Therefore, the data generation system described in this specification may generate data samples having a higher quality (i.e., that follow the true distribution of the real data samples more closely) than some conventional systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a data generation system for generating new data samples using a generator neural network that has been jointly trained with a discriminator neural network. During training, the discriminator neural network is trained to process data samples to discriminate between data samples generated by the generator neural network and "real" data samples from a training set of data samples. The generator neural network is trained in tandem with the discriminator neural network to generate data samples that the discriminator neural network characterizes as likely to be real data samples. The data generation system uses the information retained in the weights of the discriminator neural network at the end of training to filter data samples generated by the generator neural network, i.e., by "accepting" only certain data samples generated by the generator neural network, and "rejecting" the remainder. These features and other features are described in more detail below.

Figure 1:
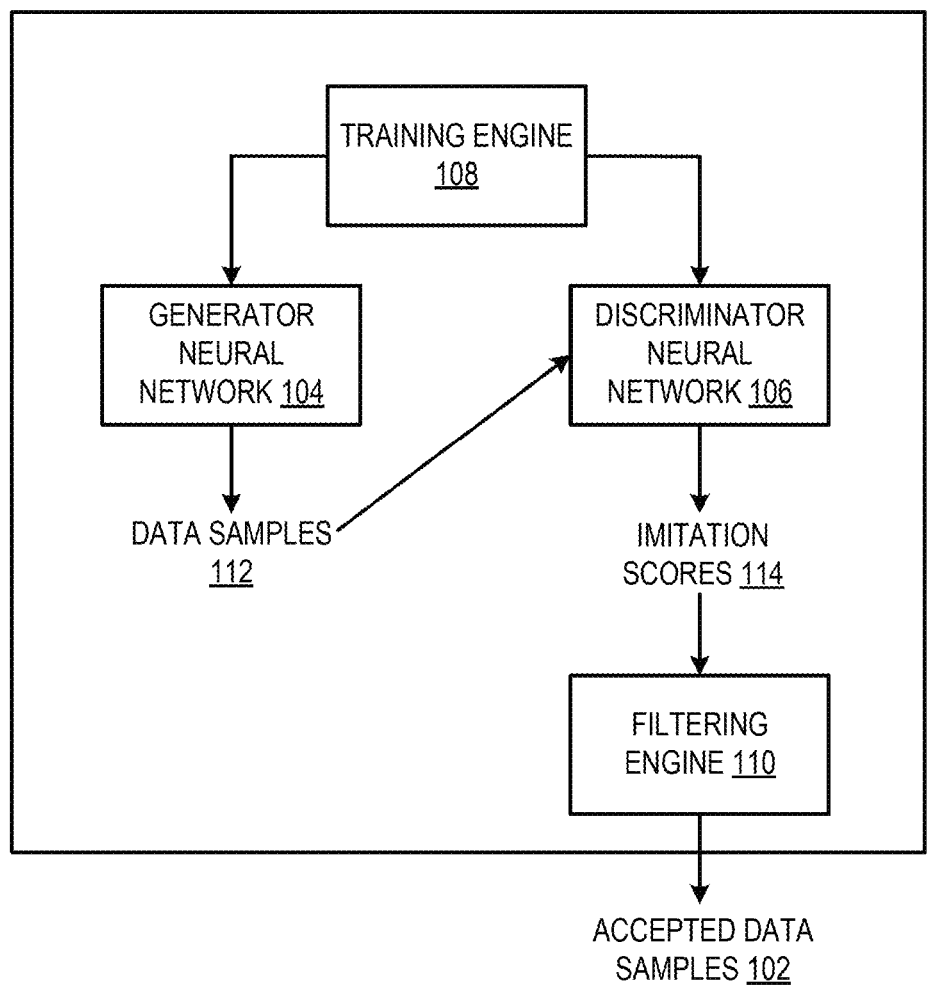
FIG. 1 shows an example data generation system.

FIG. 1 shows an example data generation system 100. The data generation system 100 is an example of a system implemented as computer programs on one or more computers in one or more locations in which the systems, components, and techniques described below are implemented.

The data generation system 100 is configured to provide data samples 102 in response to requests for data samples (e.g., from a user of the system 100). A user of the system 100 may transmit requests for data samples to the system 100, e.g., using an application programming interface (API) made available by the system. The data generation system 100 includes a generator neural network 104, a discriminator neural network 106, a training engine 108, and a filtering engine 110, each of which will be described in more detail next.

The generator neural network 104 is configured to generate data samples, e.g., images, text segments, or audio segments. Generally, the generator neural network 104 can have any appropriate neural network architecture that enables it to generate data samples 112, and the system 100 can use the generator neural network 104 to generate data samples in any of a variety of ways. In one example, to generate a new data sample 112, the system 100 may sample a latent variable from a predefined probability distribution over a space of latent variables, and provide the sampled latent variable to the generator neural network 104. The generator neural network 104 may then process the sampled latent variable using a set of neural network layers to generate a corresponding data sample. In this example, the space of latent variables may be, e.g., the set of real numbers, and the predefined probability distribution over the latent space may be, e.g., a Normal (0,1) probability distribution. In another example, to generate a new data sample 112, the generator neural network 104 may generate a probability distribution over the space of space of possible data samples, and sample the new data sample in accordance with the probability distribution.

In some implementations, the generator neural network 104 may be configured to process a "conditioning" input that specifies one or more desired characteristics of the new data sample to be generated. For example, the conditioning input may specify a type of object (e.g., vehicle, house, or bicycle) that should be depicted by an image generated by the generator neural network. As another example, the conditioning input may specify an initial image that should be modified in a specified way by an image generated by the generator neural network, e.g., the generated image may alter the appearance of the initial image by causing it to appear as though the initial image were taken on a sunny day. As another example, the conditioning input may specify: (i) a portion of text, and (ii) a speaker identity, and the generated data sample may be an audio data output that verbalizes the text in the voice of the specified speaker.

The discriminator neural network 106 is configured to process a data sample to generate an "imitation" score characterizing an estimated likelihood that the data sample is drawn from a training set of real data samples (i.e., as opposed to being generated by the generator neural network 104). For example, applying an appropriate function (e.g., a sigmoid function) to the imitation score may yield a probability value (i.e., in the range [0,1]) providing the probability that the input data sample is a real data sample.

The training engine 108 jointly trains the generator neural network 104 and the discriminator neural network 106 prior to the system 100 being used to provide data samples 102 in response to requests for data samples. In particular, the training engine 108 trains the discriminator neural network 106 to generate imitation scores that discriminate between: (i) data samples from a training set of real data samples, and (ii) data samples generated by the generator neural network 104 (e.g., using a logistic loss function). In tandem, the training engine 108 trains the generator neural network 104 to generate data samples that, when processed by the discriminator neural network, yield imitation scores that indicate a high likelihood of the data sample having been drawn from the training set of real data samples. The training engine 108 may alternate between training the generator neural network 104 based on imitation scores generated using the current values of the discriminator neural network parameters, and training the discriminator neural network based on data samples generated using the current values of the generator neural network parameters. An example method for jointly training the generator neural network 104 and the discriminator neural network is described with reference to: I. Goodfellow, J. Pouget-Abadie, M. Mirza, et al.: "Generative Adversarial Nets", Advances in Neural Information Processing Systems (NeurIPS), 2014.

Optionally, after jointly training the generator neural network 104 and the discriminator neural network 106, the training engine 108 may freeze the parameter values of the generator neural network 104 and subsequently continue to train the discriminator neural network 106 (i.e., for one or more additional training iterations). For example, the training engine 108 may continue training the discriminator neural network 106 until its performance, evaluated on a set of validation set of real data samples and data samples generated using the frozen parameter values of the generator neural network 104, achieves a maximum value. Generally, the data samples in the validation set are used only to evaluate the performance the discriminator neural network 106, and the discriminator neural network 106 is not trained on the data samples of the validation set. Performing additional training of the discriminator neural network 106 enables it to fully adapt to the final trained parameter values of the generator neural network and facilitates its subsequent use in filtering the data samples generated by the generator neural network 104, as will be described in more detail below.

After the generator neural network 104 and the discriminator neural network 106 are trained, the system 100 uses the filtering engine 110 to filter the data samples 112 generated by the generator neural network 104, and provides the "accepted" data samples 102 in response to requests for data samples. In particular, in response to receiving a request for a data sample, the system 100 generates a data sample 112 using the generator neural network 104 and processes the data sample 112 using the discriminator neural network 106 to generate a corresponding imitation score 114. The filtering engine 110 determines an "acceptance" probability (i.e., in the range [0,1]) for the data sample 112 as a function of the imitation score 114, and probabilistically determines whether the data sample 112 should be accepted (i.e., provided in response to the request) or rejected (e.g., discarded) based on the acceptance probability. In particular, the filtering engine 110 may determine the data sample 112 should be accepted with a probability provided by its acceptance probability. For example, the filtering engine 110 may sample a "control" value from a uniform probability distribution over the range [0,1], and thereafter determine the data sample should be accepted only if its acceptance probability is higher than the control value.

Optionally, rather than probabilistically filtering the data samples generated by the generator neural network (i.e., using the acceptance probabilities), the filtering engine 110 may perform deterministic filtering. For example, the filtering engine 110 may determine that a data sample should be provided in response to a request only if the imitation score for the data sample satisfies a predefined threshold (e.g., indicating a sufficiently high likelihood that the data sample is real). Performing deterministic filtering in this manner may reduce the diversity of the samples provided by the system 100, e.g., by over-representing the high probability modes of the true distribution of real data samples, and under-representing the low-probability tails of the true distribution of real data samples. On the other hand, performing deterministic filtering may be advantageous in certain situations, e.g., in situations where generating unrealistic data samples has negative consequences, e.g., if the generated data samples are audio data samples that are being broadcast live. In these situations, the diversity of the generated data samples may be less important that the assurance of their realism.

The filtering engine 110 may determine the acceptance probability for a data sample 112 as a function of the imitation score 114 for the data sample 112 in any of a variety of ways. Generally, the filtering engine 110 may map imitation scores indicating a higher likelihood that a data sample is real to a higher acceptance probability. In one example, the filtering engine 110 may determine the acceptance probability p as:

$$p=\sigma(D-D_M-\log(1-\exp(D-D_M))) \quad (1)$$

where $\sigma$ is a sigmoid function, D is the imitation score, and $D_M$ is a "bounding variable" which will be described in more detail below. As another example, the filtering engine 110 may determine the acceptance probability p as:

$$p=\sigma(D-D_M-\log(1-\exp(D-D_M-\in))-\gamma) \quad (2)$$

where $\sigma$ is a sigmoid function, D is the imitation score, $D_M$ is the bounding variable, $\in$ is a constant added for numerical stability, and $\gamma$ is a hyper-parameter modulating overall acceptance probability. Generally, increasing the value of $\gamma$ has the effect of increasing the acceptance probability for all data samples, and decreasing the value of $\gamma$ has the effect of decreasing the acceptance probability for all data samples.

The bounding variable $D_M$ referenced in equations (1) and (2) may be an estimate of the maximum value of the imitation score over the space of possible data samples (e.g., over the space of possible images). The system 100 may determine the value of the bounding variable following training of the generator neural network 104 and the discriminator neural network. For example, the system 100 may use the generator neural network to generate a population of data samples, generate a respective imitation score for each data sample using the discriminator neural network, and then determine the bounding variable to be the maximum of the imitation scores over the population. Each time the system 100 generates a new imitation score for a new data sample, the system 100 may determine whether the value of the bounding variable should be updated to the new imitation score, e.g., if the new imitation score has a higher value than the bounding variable.

The system 100 may also use a population of data samples generated by the generator neural network to determine the value of the hyper-parameter $\gamma$ referenced in equation (2). For example, the system 100 may determine the value of $\gamma$ to be a percentile (e.g., the $90^{th}$ percentile, $95^{th}$ percentile, or $98^{th}$ percentile) of the acceptance probabilities determined for the population of data samples (i.e., where the acceptance probabilities are determined with the value of $\gamma$ set to zero). Determining the hyper-parameter $\gamma$ in this manner may mitigate the possibility of the system 100 generating acceptance probabilities that are too low to be useful (e.g., acceptance probabilities that result in an excessively high fraction of data samples being rejected, thus reducing the efficiency of the system 100).

In response to the filtering engine 110 determining that the data sample 112 should be accepted, the system 100 may provide the data sample 112 in response to the request for a data sample, e.g., through an API. In the event that a user requests multiple data samples, the filtering engine 110 may continue generating new data samples and filtering them based on the acceptance probabilities until the desired number of data samples have been provided in response to the request. Data samples provided by the system 100 can be used in any of a variety of applications.

Figure 2:
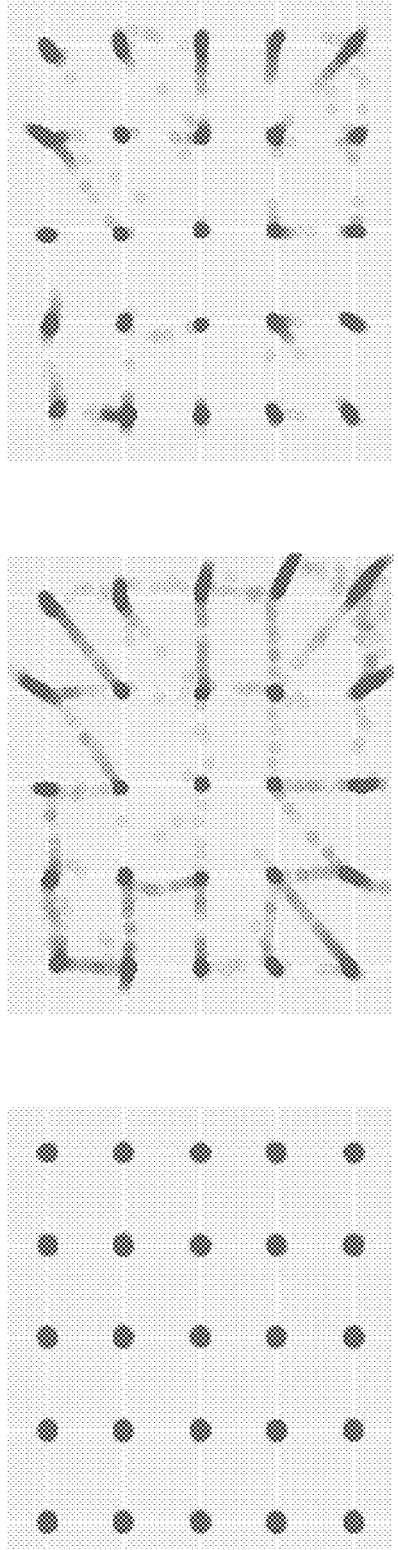
FIG. 2 provides a qualitative illustration of an example of the performance gains that can be achieved by using the data generation system.

FIG. 2 illustrates an example of the performance gains that can be achieved by using the data generation system described in this specification. In this example, the real data samples 202 are generated by sampling from 25 isotropic two-dimensional (2-D) Normal distributions (each with a standard deviation of 0.05) arranged in a grid. The GAN samples 204 are generated by a generator neural network that has been trained in tandem with a discriminator neural network. The data generation system samples 206 are generated by the data generation system described in this specification, i.e., where the data samples are probabilistically filtered using a discriminator neural network. It can be appreciated that the data generation system samples 206 capture the distribution of the real samples 202 more effectively than the GAN samples 204. FIG. 2 is illustrated with reference to low-dimensional synthetic data for convenience only; more generally, the data generation system described in this specification can be used to generate high-dimensional data samples, e.g., representing text, images, or audio.

Figure 3:
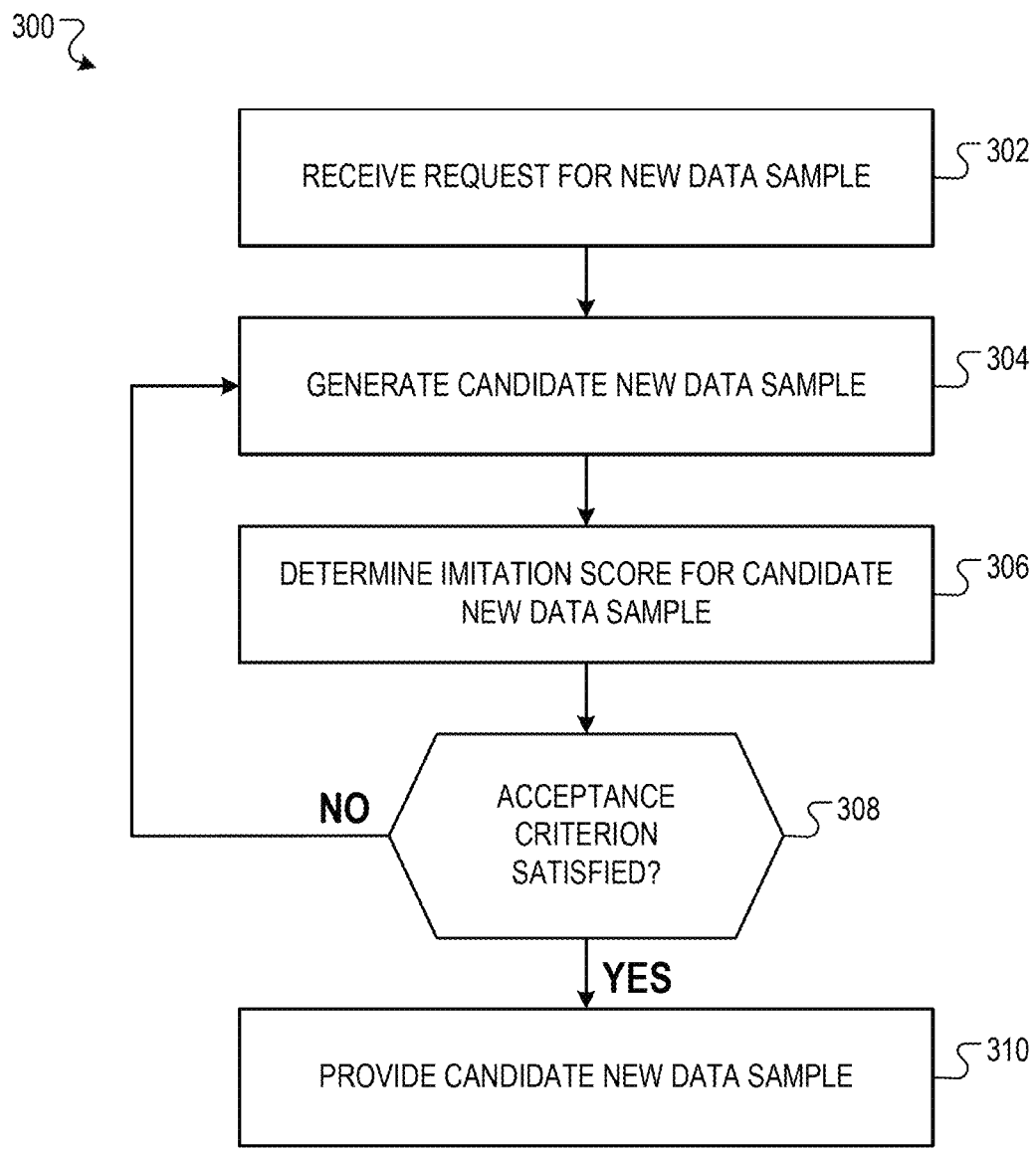
FIG. 3 is a flow diagram of an example process for providing a data sample in response to a request for a data sample.

FIG. 3 is a flow diagram of an example process 300 for providing a data sample in response to a request for a data sample. For convenience, the process 300 will be described as being performed by a system of one or more computers located in one or more locations. For example, a data generation system, e.g., the data generation system 100 of FIG. 1, appropriately programmed in accordance with this specification, can perform the process 300.

The system receives a request for a new data sample (302). The system may receive the request from a user, e.g., through an API made available by the system.

The system performs the steps 304-308 until a candidate new data sample is generated that satisfies an acceptance criterion.

The system generates a candidate new data sample using a generator neural network (304). The data sample may be, e.g., an image, a text segment, or an audio segment.

The system processes the candidate new data sample using a discriminator neural network to generate an imitation score that characterizes a likelihood for whether the data sample was: (i) drawn from a training set of real data samples, or (ii) generated by the generator neural network (306). Processing the imitation score using an activation function (e.g., a sigmoid function) may define a probability that the data sample was drawn from the training set of real data samples. The discriminator neural network may have been trained, e.g., using a logistic loss function.

The system determines whether the candidate new data sample satisfies the acceptance criterion using the imitation score (308). For example, the system may determine an acceptance score (probability) from the imitation score (e.g., using equations (1) or (2)), and obtain a control sample by sampling from a probability distribution (e.g., a uniform distribution) over a range of numerical values (e.g., the range [0,1]). The system may then determine the candidate new data sample satisfies the acceptance criterion if the acceptance score has a higher value than the control sample. As part of determining the acceptance score from the imitation score, the system may update the value of a bounding variable by determining the current value of the bounding variable to be the maximum of: (i) a previous value of the bounding variable, and (ii) the imitation score.

In response to determining that the candidate new data sample does not satisfy the acceptance criterion, the system returns to step 304. In response to determining that the candidate new data sample satisfies the acceptance criterion, the system provides the candidate new data sample in response to the request (310).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   receiving a request for a data sample;
   until a new data sample is generated that satisfies an acceptance criterion, performing operations comprising:
      generating a candidate new data sample using a generator neural network;
      processing the candidate new data sample using a discriminator neural network to generate an imitation score,
         wherein the discriminator neural network has been trained to generate an imitation score for a data sample that characterizes a likelihood for whether the data sample was: (i) drawn from a training set of given data samples, or (ii) generated by the generator neural network; and
      determining, from the imitation score, whether the candidate new data sample satisfies the acceptance criterion; and
   providing the new data sample that satisfies the acceptance criterion in response to the received request.

2. The method of claim 1, wherein candidate new data samples generated by the generator neural network are images.

3. The method of claim 1, wherein determining, from the imitation score, whether the candidate new sample satisfies the acceptance criterion comprises:
   determining an acceptance score from the imitation score;
   obtaining a control sample by sampling from a probability distribution over a range of numerical values; and
   determining the candidate new data sample satisfies the acceptance criterion if the acceptance score has a higher value than the control sample.

4. The method of claim 3, wherein determining an acceptance score from the imitation score comprises:
   updating a value of a bounding variable by determining a current value of the bounding variable to be a maximum of: (i) a previous value of the bounding variable, and (ii) the imitation score; and
   determining the acceptance score from the imitation score and the updated bounding variable.

5. The method of claim 4, wherein determining the acceptance score from the imitation score and the updated bounding variable comprises:
   determining the acceptance score to be $\sigma(a)$, wherein $\sigma(\cdot)$ is a sigmoid function, wherein a is defined as:

$$a := D - D_M - \log(1 - \exp(D - D_M)),$$

wherein D is the imitation score, and wherein $D_M$ is the current value of the bounding variable.

6. The method of claim 4, wherein determining the acceptance score from the imitation score and the updated bounding variable comprises:
   determining the acceptance score to be $\sigma(a-\gamma)$, wherein $\sigma(\cdot)$ is a sigmoid function, wherein $\gamma$ is a numerical value, wherein a is defined as:

$$a := D - D_M - \log(1 - \exp(D - D_M - \in)),$$

wherein D is the imitation score, wherein $D_M$ is the current value of the bounding variable, and wherein $\in$ is a constant added for numerical stability.

7. The method of claim 6, further comprising:
   determining the numerical value $\gamma$ to be a predetermined percentile of previously determined acceptance scores.

8. The method of claim 3, wherein obtaining a control sample by sampling from a probability distribution over a range of numerical values comprises:
   obtaining the control sample by sampling from a uniform probability distribution over the range [0,1].

9. The method of claim 1, wherein the discriminator neural network has been trained using a logistic loss function.

10. The method of claim 1, wherein processing the imitation score using a sigmoid function defines a probability that the data sample was drawn from the training set of given data samples.

11. A system comprising one or more computers and one or more storage devices storing instructions that when executed by the one or more computers cause the one or more computers to perform operations comprising:
   receiving a request for a data sample;
   until a new data sample is generated that satisfies an acceptance criterion, performing operations comprising:
      generating a candidate new data sample using a generator neural network;
      processing the candidate new data sample using a discriminator neural network to generate an imitation score,
         wherein the discriminator neural network has been trained to generate an imitation score for a data sample that characterizes a likelihood for whether the data sample was: (i) drawn from a training set of given data samples, or (ii) generated by the generator neural network; and
      determining, from the imitation score, whether the candidate new data sample satisfies the acceptance criterion; and
   providing the new data sample that satisfies the acceptance criterion in response to the received request.

12. The system of claim 11, wherein candidate new data samples generated by the generator neural network are images.

13. The system of claim 11, wherein determining, from the imitation score, whether the candidate new sample satisfies the acceptance criterion comprises:
   determining an acceptance score from the imitation score;
   obtaining a control sample by sampling from a probability distribution over a range of numerical values; and
   determining the candidate new data sample satisfies the acceptance criterion if the acceptance score has a higher value than the control sample.

14. The system of claim 13, wherein determining an acceptance score from the imitation score comprises:
   updating a value of a bounding variable by determining a current value of the bounding variable to be a maximum of: (i) a previous value of the bounding variable, and (ii) the imitation score; and determining the acceptance score from the imitation score and the updated bounding variable.

15. The system of claim 14, wherein determining the acceptance score from the imitation score and the updated bounding variable comprises:

determining the acceptance score to be σ(a), wherein σ(·) is a sigmoid function, wherein is defined as:

$$a:=D-D_M-\log(1-\exp(D-D_M)),$$

wherein D is the imitation score, and wherein $D_M$ is the current value of the bounding variable.

16. One or more non-transitory computer storage media storing instructions that when executed by one or more computers cause the one or more computers to perform operations comprising:

receiving a request for a data sample;

until a new data sample is generated that satisfies an acceptance criterion, performing operations comprising:

generating a candidate new data sample using a generator neural network;

processing the candidate new data sample using a discriminator neural network to generate an imitation score, wherein the discriminator neural network has been trained to generate an imitation score for a data sample that characterizes a likelihood for whether the data sample was: (i) drawn from a training set of given data samples, or (ii) generated by the generator neural network; and determining, from the imitation score, whether the candidate new data sample satisfies the acceptance criterion; and providing the new data sample that satisfies the acceptance criterion in response to the received request.

17. The non-transitory computer storage media of claim 16, wherein candidate new data samples generated by the generator neural network are images.

18. The non-transitory computer storage media of claim 16, wherein determining, from the imitation score, whether the candidate new sample satisfies the acceptance criterion comprises:

determining an acceptance score from the imitation score;

obtaining a control sample by sampling from a probability distribution over a range of numerical values; and determining the candidate new data sample satisfies the acceptance criterion if the acceptance score has a higher value than the control sample.

19. The non-transitory computer storage media of claim 18, wherein determining an acceptance score from the imitation score comprises:

updating a value of a bounding variable by determining a current value of the bounding variable to be a maximum of: (i) a previous value of the bounding variable, and (ii) the imitation score; and determining the acceptance score from the imitation score and the updated bounding variable.

20. The non-transitory computer storage media of claim 19, wherein determining the acceptance score from the imitation score and the updated bounding variable comprises:

determining the acceptance score to be σ(a), wherein σ(·) is a sigmoid function, wherein a is defined as:

$$a:=D-D_M-\log(1-\exp(D-D_M)),$$

wherein D is the imitation score, and wherein $D_M$ is the current value of the bounding variable.

* * * * *